(12) United States Patent
Dumont

(10) Patent No.: US 8,746,799 B2
(45) Date of Patent: Jun. 10, 2014

(54) HEADREST SUPPORT ROD

(75) Inventor: Jeffrey Dumont, Royal Oak, MI (US)

(73) Assignee: Nissan North America, Inc., Franklin, TN (US)

( * ) Notice: Subject to any disclaimer, the term of this patent is extended or adjusted under 35 U.S.C. 154(b) by 604 days.

(21) Appl. No.: 12/968,445

(22) Filed: Dec. 15, 2010

(65) Prior Publication Data

US 2012/0153699 A1 Jun. 21, 2012

(51) Int. Cl.
*B60N 2/48* (2006.01)

(52) U.S. Cl.
USPC .......................................... 297/403; 297/408

(58) Field of Classification Search
USPC ........................ 297/331, 334, 403, 408, 391
See application file for complete search history.

(56) References Cited

U.S. PATENT DOCUMENTS

| | | | |
|---|---|---|---|
| 3,586,366 A | 6/1971 | Patrick | |
| 4,706,488 A * | 11/1987 | Williamson | 72/96 |
| 4,711,494 A | 12/1987 | Duvenkamp | |
| 5,681,079 A | 10/1997 | Robinson | |
| 6,902,232 B2 | 6/2005 | Kamrath et al. | |
| 6,908,137 B2 | 6/2005 | Doxey et al. | |
| 7,108,323 B2 | 9/2006 | Welch et al. | |
| 7,121,626 B2 * | 10/2006 | Akehi et al. | 297/410 |
| 7,201,437 B2 | 4/2007 | Freijy | |
| 7,325,877 B2 * | 2/2008 | Brockman et al. | 297/408 |
| 7,543,891 B2 | 6/2009 | Chung | |
| 7,559,608 B2 | 7/2009 | Miyahara et al. | |
| 2005/0052065 A1 | 3/2005 | Rothstein et al. | |
| 2005/0200185 A1 * | 9/2005 | Yokoyama et al. | 297/410 |
| 2007/0000973 A1 | 1/2007 | Johnson et al. | |
| 2009/0295211 A1 * | 12/2009 | Granath | 297/403 |
| 2010/0045089 A1 * | 2/2010 | Yoshida | 297/391 |
| 2011/0221250 A1 * | 9/2011 | Little | 297/408 |
| 2011/0254339 A1 * | 10/2011 | Bruck | 297/403 |

FOREIGN PATENT DOCUMENTS

| | | |
|---|---|---|
| DE | 299 08 893 | 9/2000 |
| WO | 2006074080 | 7/2006 |

OTHER PUBLICATIONS

Middleville Tool and Die Co., Inc. Brochure, date unknown.

* cited by examiner

*Primary Examiner* — David R Dunn
*Assistant Examiner* — Timothy J Brindley
(74) *Attorney, Agent, or Firm* — Young, Basile, Hanlon & MacFarlane, P.C.

(57) ABSTRACT

A headrest support rod includes a shaft portion and a support portion. The shaft portion has a first end, a second end, and an annular wall. The annular wall defines a cavity that extends from the first end to the second end. The support portion is formed adjacent to the second end of the shaft portion. At least part of the support portion is a continuous extension of the annular wall of the shaft portion. The shaft portion and the support portion are unitarily formed.

14 Claims, 9 Drawing Sheets

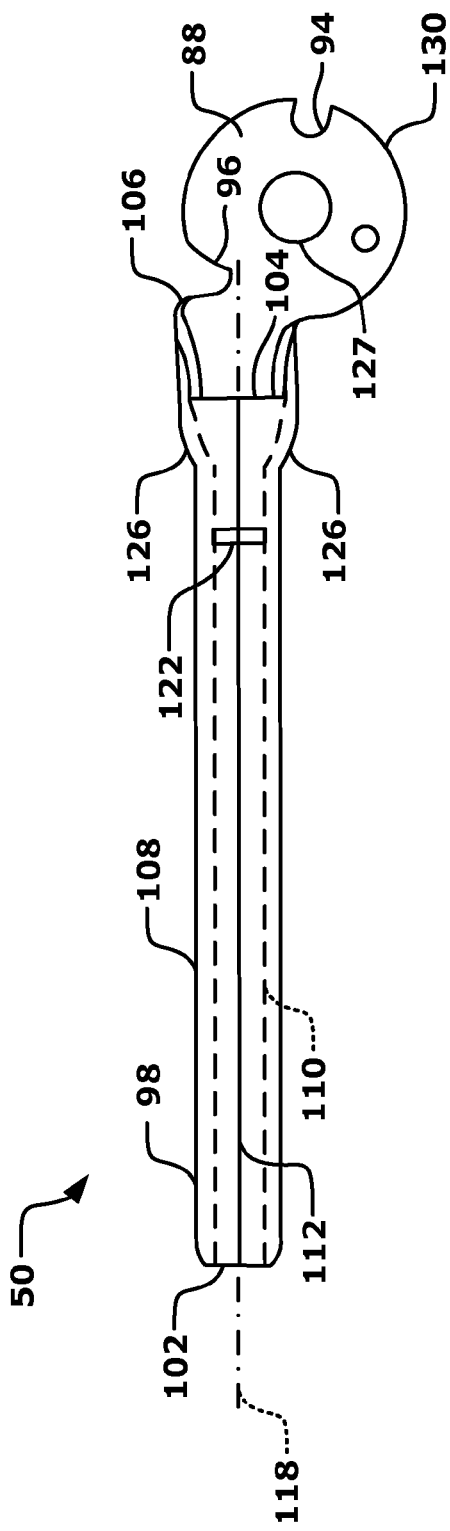
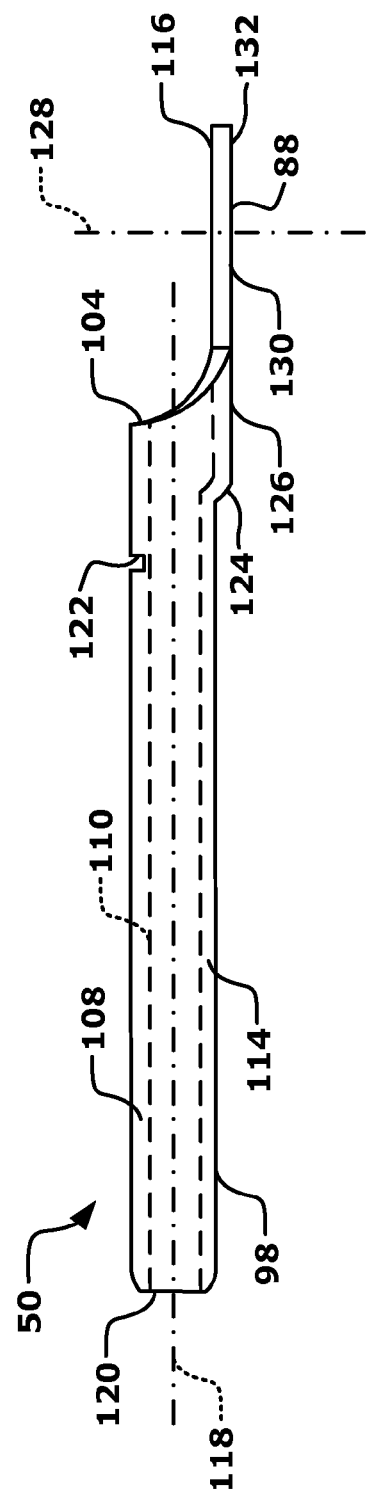
FIG. 8A
FIG. 8B

HEADREST SUPPORT ROD

FIELD OF THE INVENTION

The invention relates to the field of folding headrests for vehicles, and more particularly, the invention relates to a one-piece support rod for a folding headrest.

BACKGROUND OF THE INVENTION

Vehicle seats often include a variety of adjustment mechanisms that allow the position of the entire seat to be adjusted and also to allow the positions of the constituent portions of the seat to be adjusted with respect to one another. These adjustments not only allow for a wide variety of driver body types to be comfortably accommodated by the vehicle seat but also can be utilized to improve ingress and egress with respect to the vehicle, as well as to move or stow the seat to provide additional cargo room.

For example, some rear seats in vehicles such as SUVs, crossovers, and minivans fold in half, stow into the floor, and/or pivot about a floor attachment point in order to increase cargo carrying capability. Such cargo carrying configurations, however, typically provide little space between the adjusted seats and other adjacent seats or trim surfaces within the vehicle in order to maximize cargo space. This makes it difficult to make geometric changes to the design of the vehicle. In particular, if a vehicle designer wishes to increase the size of a seating surface to increase comfort or support, this must be done without disturbing or eliminating the adjustment functionality of the seat.

Among the various portions of a vehicle seat, the headrest of the seat presents particular design challenges. In particular, the position and geometry of a typical headrest is such that folding a seat into a cargo carrying configuration may result in interference between the headrest and an adjacent seat. For this reason, headrests often move or pivot such that they do not interfere with adjacent seats or surfaces when the seat is in a cargo carrying configuration. Such headrest structures, however, have a tendency to be complicated, expensive, and formed from multiple parts that lack aesthetic appeal.

In light of the foregoing, there remains a need for improvement in headrest structures having reduced cost and complexity while also improving aesthetics.

SUMMARY

A headrest support rod taught herein includes a shaft portion and a support portion that are unitarily formed. The shaft portion has a first end, a second end, and an annular wall. The annular wall defines a cavity that extends from the first end to the second end. The support portion is formed adjacent to the second end of the shaft portion. At least part of the support portion is a continuous extension of the annular wall of the shaft portion.

The support portion may be substantially planar. Furthermore, the support portion may have a substantially circular periphery in a plane that is parallel to a longitudinal direction of the shaft portion. A cutout may be formed in the support portion along the substantially circular periphery of the support portion. The cutout may be substantially U-shaped in a plane that is parallel to a longitudinal direction of the shaft portion. The cutout may be formed adjacent to the second end of the shaft portion. Also, the cutout may be formed along a portion of the substantially circular periphery that is distal relative to the shaft portion.

A neck portion may be interposed between the shaft portion and the support portion. The neck portion transitions from a tubular surface defined by the annular wall of the shaft portion to a planar surface defined by the support portion.

The support portion may define a circular rotation aperture having a center axis that is perpendicular to a longitudinal direction of the shaft portion. Furthermore, the center axis of the rotation aperture is laterally offset from a longitudinal axis of the shaft portion such that the center axis and the longitudinal axis do not intersect one another, wherein the longitudinal axis of the shaft portion is parallel to a longitudinal direction of the shaft portion.

A notch may be formed on the outer surface of the annular wall of the shaft portion. The notch may extend in a direction that is perpendicular to a longitudinal direction of the shaft portion. Furthermore, the notch may extend only partially into the annular wall of the shaft portion, such that the notch does not penetrate the cavity of the shaft portion. Also, a distance between the notch and the first end of the shaft portion may be greater than a distance between the notch and the second end of the shaft portion.

The shaft portion may include a seam that extends from the first end of the shaft portion to the second end of the shaft portion. Furthermore, the seam may extend through the annular wall of the shaft portion from an outer surface of the shaft portion to the cavity of the shaft portion. In addition, a notch may be formed on the outer surface of the shaft portion, wherein the notch spans the seam of the shaft portion. Moreover, the seam may be located circumferentially opposite from a section of the annular wall from which the support portion continuously extends. The shaft portion and the support portion may be formed from a single piece of material having a consistent thickness throughout.

At least part of the neck portion may have an outer radius that is larger than an outer radius of the shaft portion.

BRIEF DESCRIPTION OF THE DRAWINGS

The description herein makes reference to the accompanying drawings wherein like reference numerals refer to like parts throughout the several views, and wherein:

FIG. 8*a* is a plan view of a one-piece support rod having a rod portion and a ring portion;

FIG. 8*b* is a side profile view of the one-piece support rod; and

DETAILED DESCRIPTION

Figure 1:
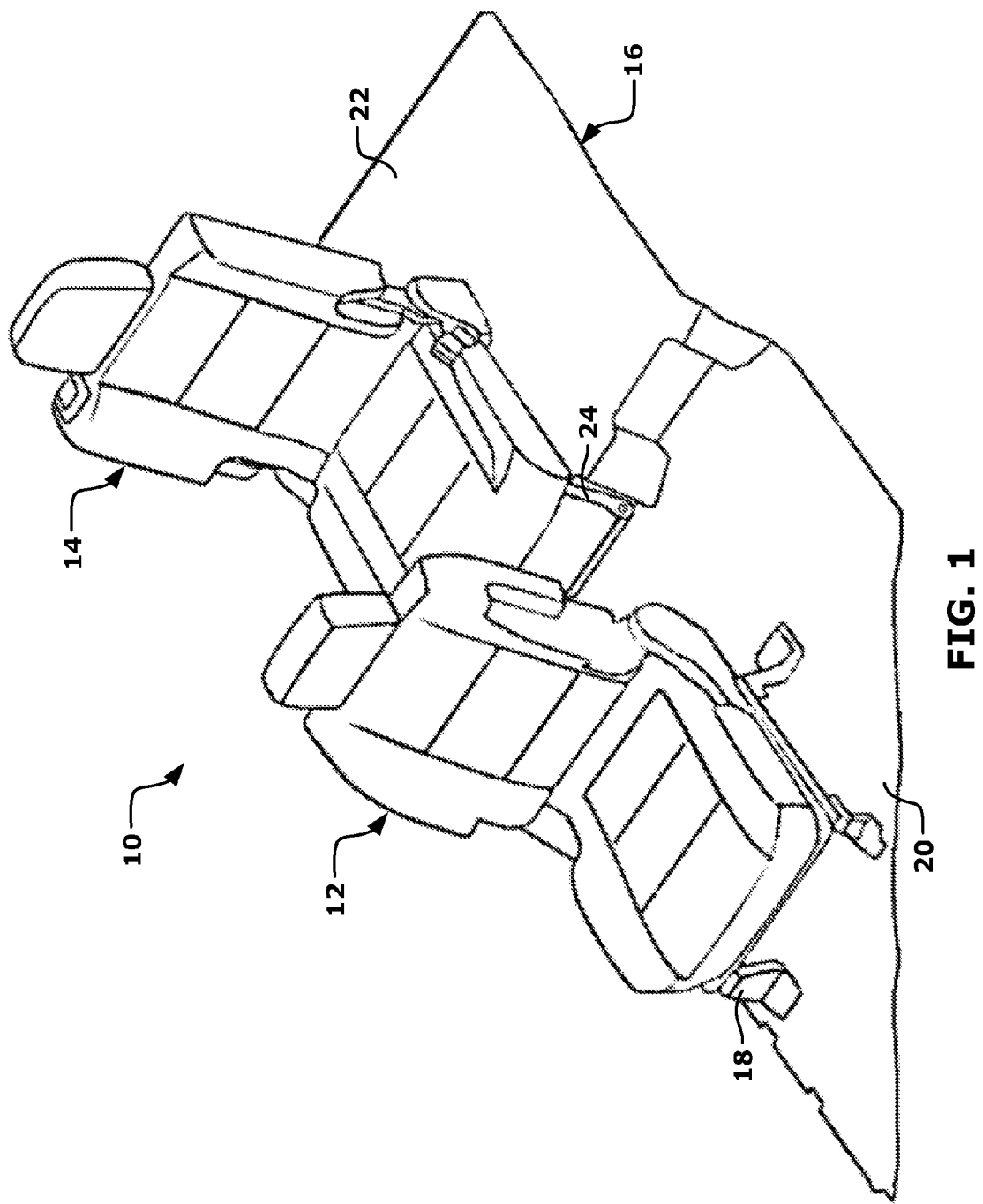
FIG. 1 is a perspective view of a vehicle seating arrangement including a front seat and a rear seat, wherein the vehicle seating arrangement is disposed in a passenger carrying configuration.

FIG. 1 shows a passenger compartment 10 of a vehicle (not shown) in which a front seat 12 and a rear seat 14 are supported with respect to a vehicle floor 16 of the vehicle. The front seat 12 is connected to the vehicle floor 16 by a riser 18, within a lower portion 20 of the vehicle floor 16. The rear seat 14 is disposed on a raised portion 22 of the vehicle floor 16 and is connected to the vehicle floor 16 by a mounting bracket 24. The riser 18 allows the front seat 12 to be vertically spaced from the vehicle floor 16, while the mounting bracket 24 allows the rear seat 14 to be directly attached to the vehicle floor 16. This allows the front seat and the rear seat to be positioned at a substantially equal elevation despite the elevational change within the vehicle floor 16 between the lower portion 20 and the raised portion 22 thereof. In FIG. 1, the rear seat 14 is disposed in a passenger carrying configuration. As will be explained herein, the rear seat 14 is moveable from the passenger carrying configuration to a cargo carrying configuration.

Figure 2:
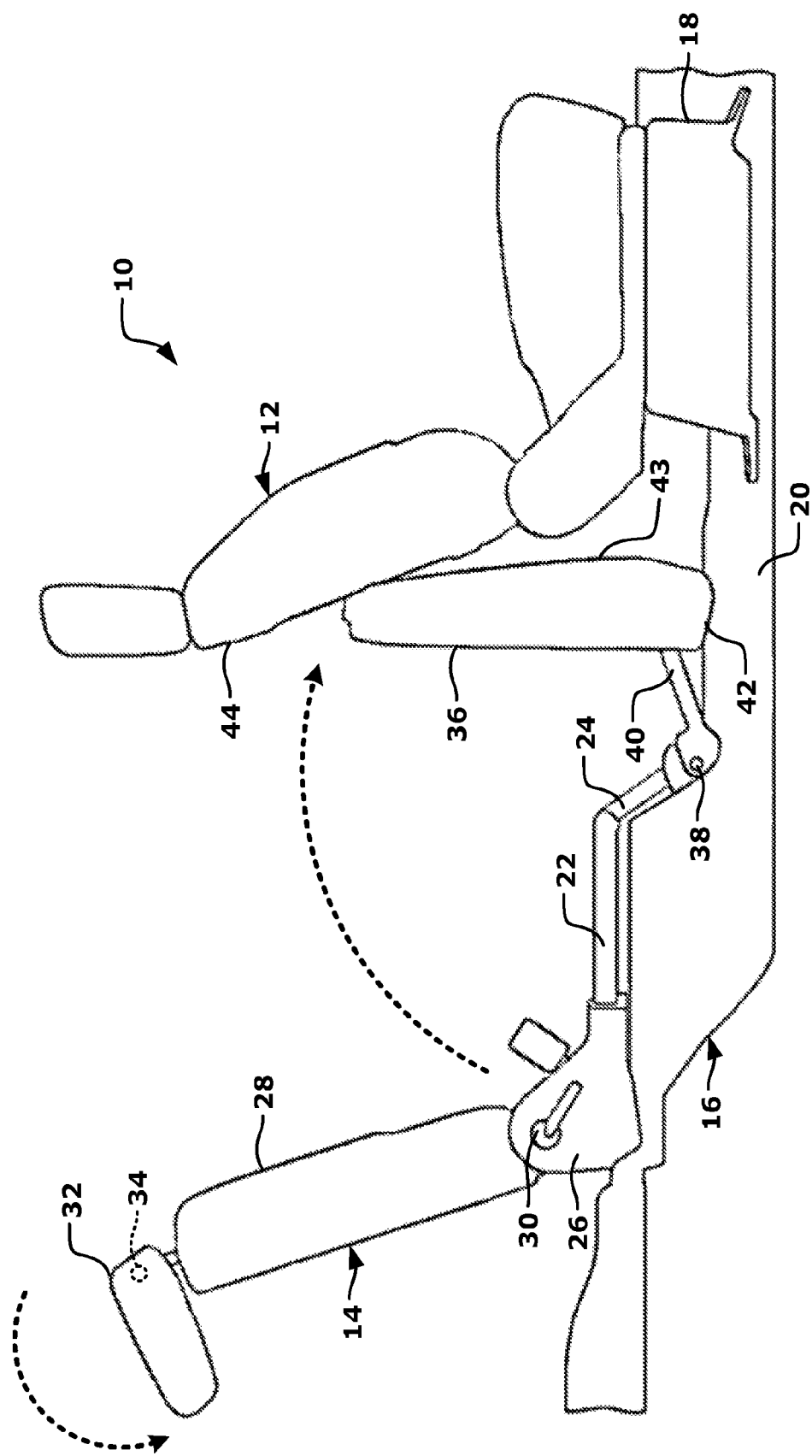
FIG. 2 is a side view of the vehicle seating arrangement in an intermediate configuration.

FIG. 2 shows the rear seat 14 disposed in an intermediate configuration that occurs while the rear seat 14 is being moved from the passenger carrying configuration to the cargo carrying configuration. The rear seat 14 includes a base portion 26 that is disposed on the vehicle floor 16 in the raised portion 22 thereof and is either connected to the mounting bracket 24, or, alternatively, could be a portion of the mounting bracket 24 or could be independent of the mounting bracket 24. A seat back 28 of the rear seat 14 is connected to the base portion 26 at a seat back pivot joint 30.

In the passenger carrying configuration (FIG. 1) and in the intermediate configuration, the seat back 28 of the rear seat 14 extends upward from the base portion 26, at an angle that is suitable for supporting the back of a passenger when the rear seat 14 is in the passenger carrying configuration. The seat back pivot joint 30 allows the seat back 28 of the rear seat 14 to pivot with respect to the base portion 26 about an axis that extends transverse to the rear seat 14.

The rear seat 14 also includes a head rest 32. The head rest 32 is supported with respect to the seat back 28 of the rear seat 14 such that it is capable of pivoting about a head rest axis 34 that extends through the head rest 32 in a transverse direction. In the passenger carrying configuration (FIG. 1), the head rest 32 is in an upright position suitable for supporting the head of a passenger. In the intermediate configuration, however, the head rest 32 has been pivoted rearwardly about the head rest axis 34.

A cushion 36 of the rear seat 14 is pivotally mounted to the mounting bracket 24 for pivotal motion of the cushion 36 of the rear seat 14 about a cushion pivot joint 38 that defines an axis that extends transverse to the rear seat 14. The cushion pivot joint 38 is located adjacent to the lower portion 20 of the vehicle floor 16. A rotation bracket 40 is directly connected to the mounting bracket 24 at the cushion pivot joint 38 and is connected to the cushion 36 opposite the cushion pivot joint 38, so as to define a slightly eccentric pivoting motion for the cushion 36 with respect to the remainder of the rear seat 14.

In the passenger carrying configuration (FIG. 1), the cushion 36 is disposed adjacent to the seat back 28 of the rear seat 14 at a position suitable for supporting a passenger. In the intermediate configuration and in the cargo carrying configuration (FIG. 3), the cushion 36 has been pivoted forward about the axis defined by the cushion pivot joint 38, such that the cushion 36 is moved forwardly away from the base portion 26 and the seat back 28 of the rear seat 14. In particular, the cushion 36 is rotated until a front face 42 of the cushion rests upon the lower portion 20 of the vehicle floor 16, which places the cushion 36 in a substantially upright position where a seating surface 43 of the cushion 36 is disposed adjacent to or in engagement with a seat back 44 of the front seat 12.

Figure 3:
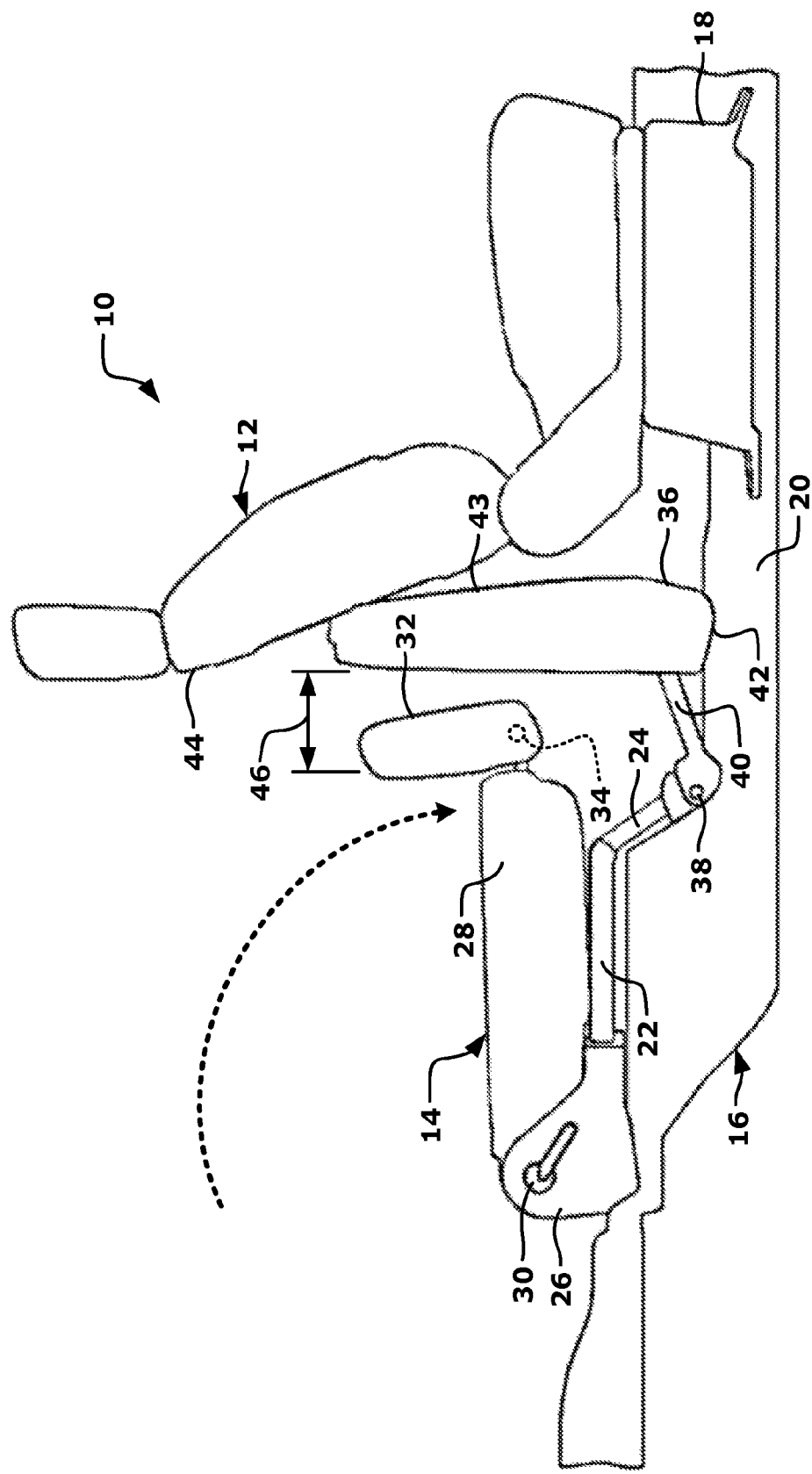
FIG. 3 is a side view of the vehicle seating arrangement in a cargo carrying configuration.

In the cargo carrying configuration, as shown in FIG. 3, the seat back 28 and the head rest 32 of the rear seat 14 have been pivoted in unison about the seat back pivot joint 30, with respect to the base portion 26 and the mounting bracket 24 of the rear seat 14. This places the seat back 28 of the rear seat 14 in a substantially flat configuration, where it is disposed adjacent to the raised portion 22 of the vehicle floor 16. As a result of the rearward pivoting of the head rest 32 with respect to the seat back 28 upon movement to the intermediate configuration from the passenger carrying configuration, the head rest 32 is now disposed in a substantially upright orientation and is located adjacent to or in contact with the cushion 36 of the rear seat 14. More particularly, the head rest 32 is located within a head rest clearance area 46 that is defined as the distance between the cushion 36 and the seat back 28 when the rear seat 14 is in the cargo carrying configuration.

Figure 4:
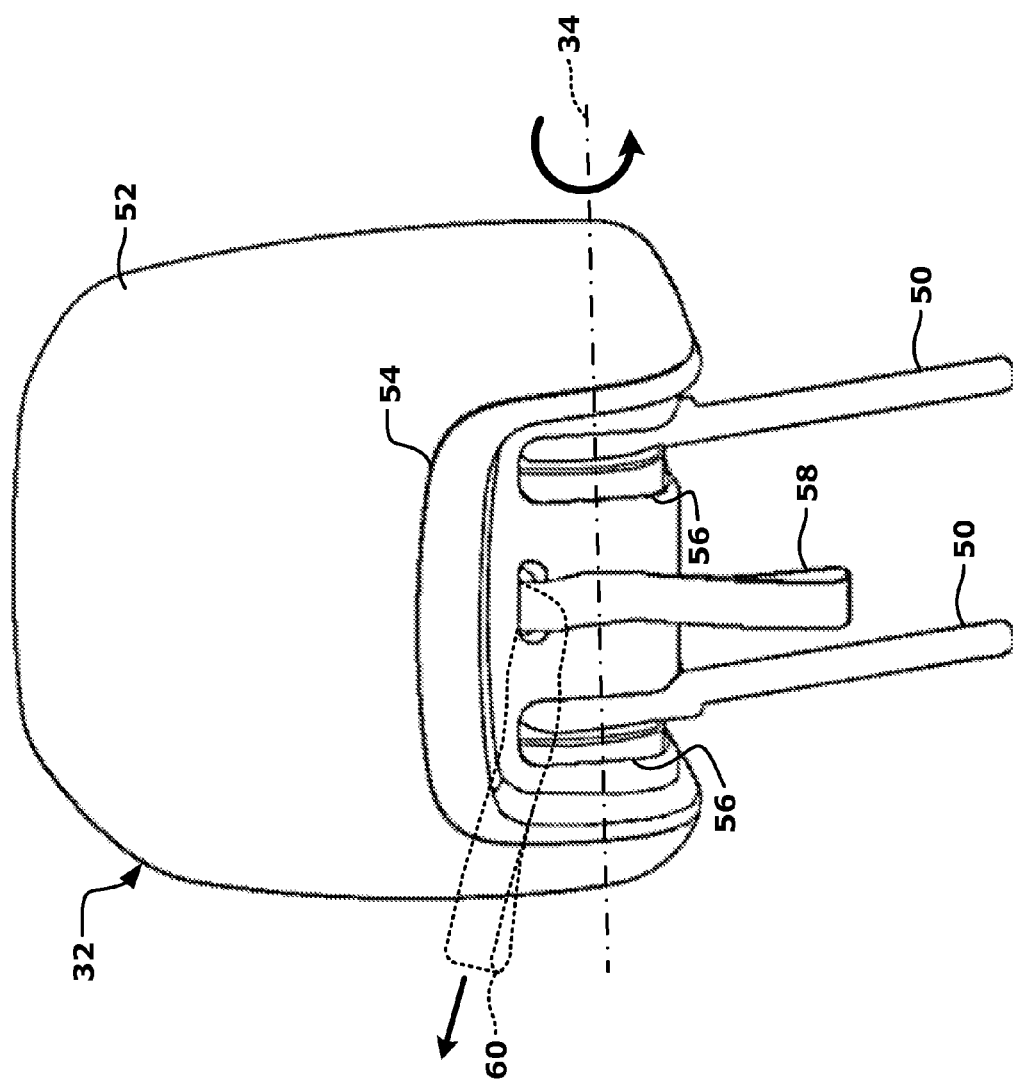
FIG. 4 is a rear perspective view of a headrest.

As shown in FIG. 4, the head rest 32 is supported with respect to the seat back 28 of the rear seat 14 by a pair of head rest support rods 50 according to the present invention. The head rest 32 includes a cover portion 52 and a trim piece 54. The head rest support rods 50 extend through rod apertures 56 that are formed through the trim piece 54. Consequently, a portion of each of the head rest support rods 50 is disposed within the head rest 32.

The head rest 32 is pivotal with respect to the head rest support rods 50 when a release strap 58 is operated, such as by pulling the release strap 58 to a release position 60. This causes the head rest 32 to pivot with respect to the head rest support rods 50 about the head rest axis 34. Consequently, when the head rest 32 is installed with respect to the seat back 28 of the rear seat 14, the head rest support rods 50 are maintained in a releasably secured relationship with respect to the seat back 28 while the head rest 32 pivots with respect to both the head rest support rods 50 and the seat back 28 of the rear seat 14. For example, the releasably secured relationship between the head rest support rods 50 and the rear seat back 28 may still allow for sliding adjustment of the head rest 32 with respect to the rear seat back 28 in a conventional manner.

Figure 5:
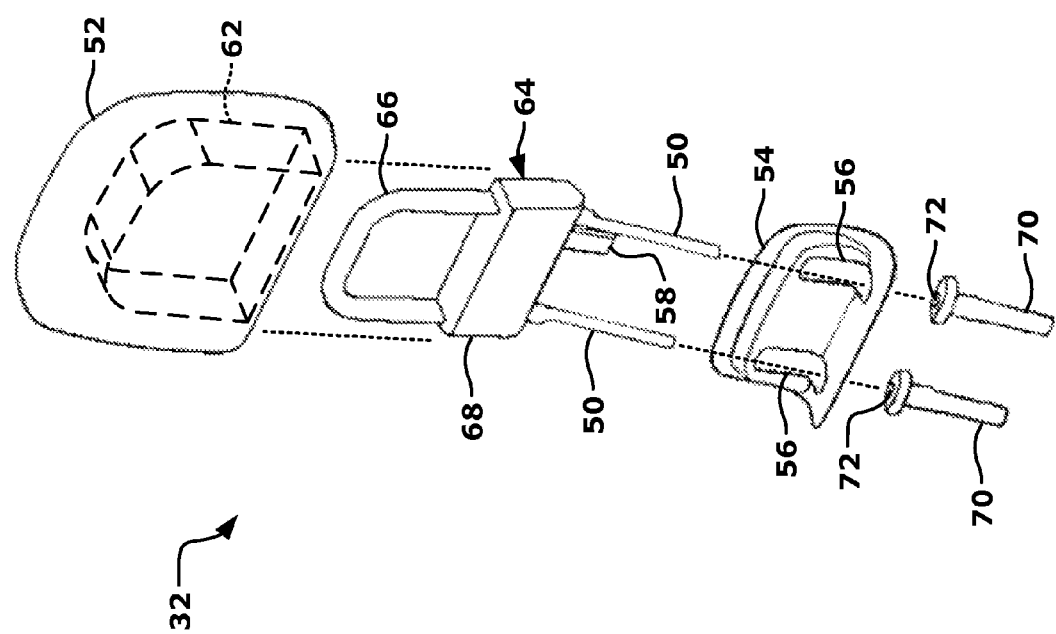
FIG. 5 is an exploded perspective view of the headrest including a folding mechanism.

As shown in FIG. 5, a cavity 62 is defined within the cover 52 of the head rest 32 for receiving a folding mechanism 64 therein. The folding mechanism 64 includes a frame 66 that supports the cover 52 of the head rest 32, a body portion 68 that is rigidly connected to the frame 66, and the support rods 50, which are pivotally connected to the frame 66 and the body portion 68, as will be explained in detail herein.

The frame 66 and the body portion 68 are seated within the cavity 62 of the cover 52 of the head rest 32. The trim piece 54 closes the cavity 62, such that the only portions of the folding mechanism 64 that extend out of the head rest 32 are the support rods 50, which extend through the rod apertures 56 in the trim piece 54.

In order to connect the head rest 32 to the seat back 28 of the rear seat 14, rod holders 70 are provided in a fixed connection with the seat back 28 of the rear seat 14. The rod holders 70 define rod openings 72, into which the support rods 50 are releasably receivable for generally securing the head rest 32 with respect to the seat back 28 of the rear seat 14. However, as mentioned above, the rod holders may still facilitate sliding adjustment of the head rest 32 with respect to the rear seat back 28 of the rear seat 14 via the head rest support rods 50.

Figure 6:
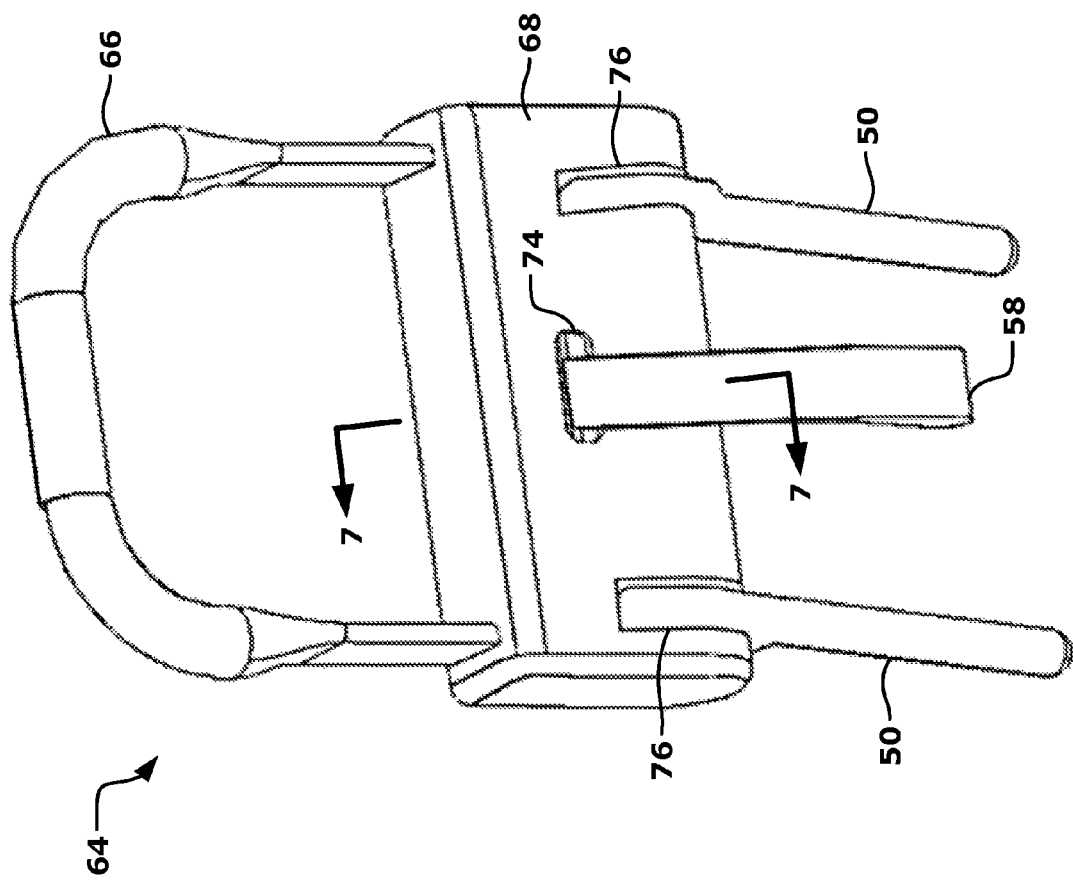
FIG. 6 is a rear perspective view of the folding mechanism.

As shown in FIG. 6, the release strap 58 extends into the interior of the body portion 68 of the folding mechanism 64 through a strap aperture 74. The support rods 50 extend into the interior of the body portion 68 of the folding mechanism 64 through respective rotation cutouts 76, which extend through the body portion 68 and are configured to allow the support rods 50 to pivot with respect to the body portion 68.

Figure 7:
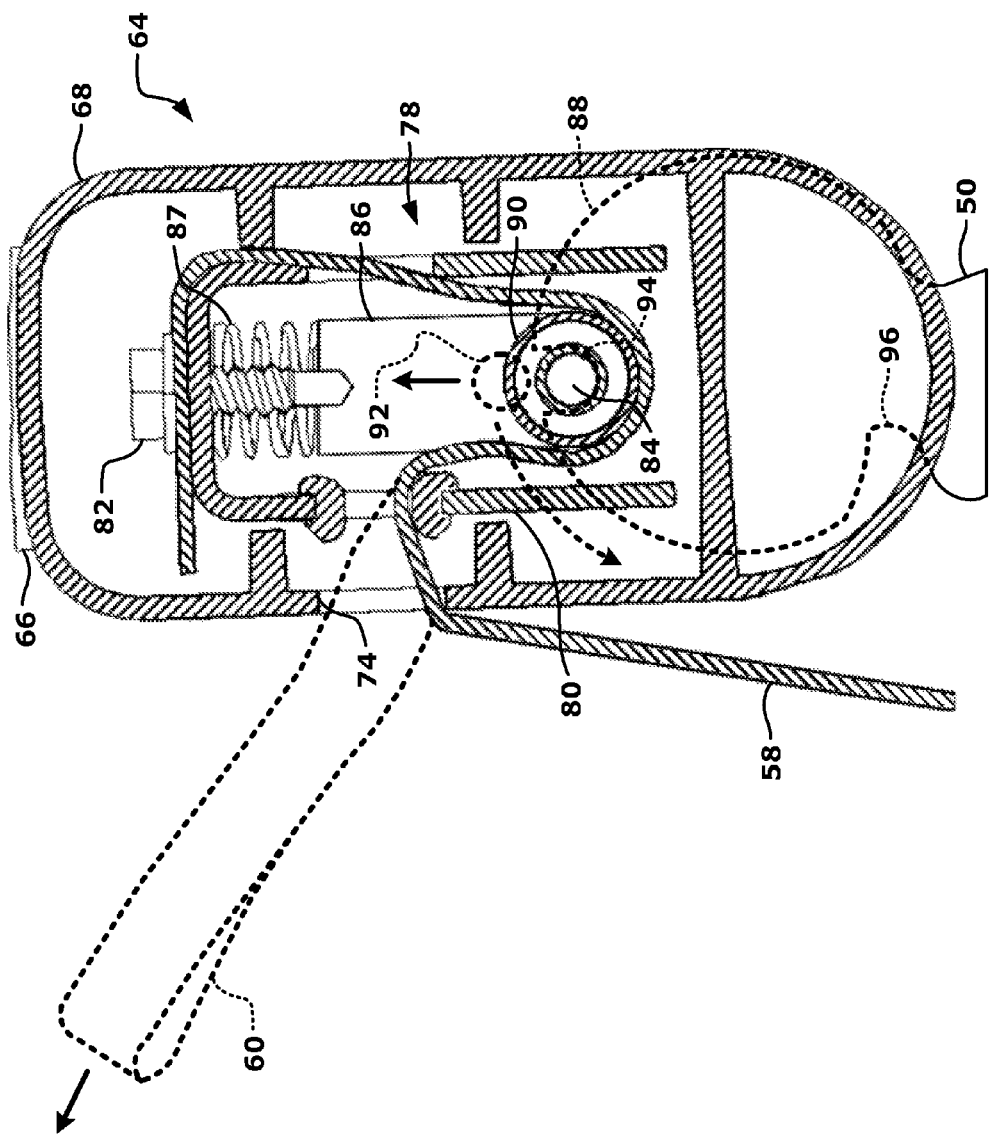
FIG. 7 is a vertical side section taken along line 7-7 in FIG. 6 showing actuation of the folding mechanism as well as first and second positions of a lock rod with respect to a support rod.

As shown in FIG. 7, a release mechanism 78 is provided within the body portion 68 of the folding mechanism 64 to selectively lock and release the support rods 50 with respect to the body portion 68 of the folding mechanism 64. The release mechanism 78 includes an inner frame 80 that is disposed within the body portion 68, to which the components of the release mechanism 78 are mounted. By way of example and not limitation, the inner frame 80 may be an elongate, U-shaped structure having an open bottom. The release strap 58 is connected to the inner frame 80 of the release mechanism 78 by a fastener 82 for selectively releasing the release mechanism 78 and thereby allowing the rods 50 to pivot with respect to the body portion 68 of the folding mechanism 64, as will be explained in detail herein.

The release mechanism 78 includes a locking rod 84, which is supported at its ends by a rod carrier 86. The rod carrier 86 is biased downward by a compression spring 87 that is interposed between the rod carrier 86 and the inner frame 80. This downward biasing moves the locking rod 84 downward toward engagement with a support portion 88 of each of the support rods 50. In order to selectively move the locking rod 84 upward away from engagement with the support portion 88 of the support rods 50, the release strap 58 is looped under the locking rod 84 in engagement with a roller 90 that is disposed on the locking rod 84. Pulling the release strap 58 to its release position 60 results in engagement of the release strap 58 with the roller 90, which moves the locking rod and the rod carrier 86 upward against the force of the compression spring 87. Thus, when the release strap 58 is moved to its release position 60, the locking rod 84 is moved to a released position 92.

The release mechanism 78 is in its engaged position when the locking rod 84 is seated within either of a use cutout 94 or a folded cutout 96 that are defined on the support portion 88 of the support rods 50. Disposition of the locking rod 84 within the use cutout 94 corresponds to an unfolded position of the head rest 32, such as in the passenger carrying configuration of the rear seat 14. Disposition of the locking rod 84 within the folded cutout 96 of each of the support portions 88 of the support rods 50 occurs when the support rods 50 have been pivoted with respect to the body portion 68 of the folding mechanism 64. This corresponds to disposition of the head rest 32 in a folded position, such as in the cargo carrying configuration of the rear seat 14.

Figure 9:
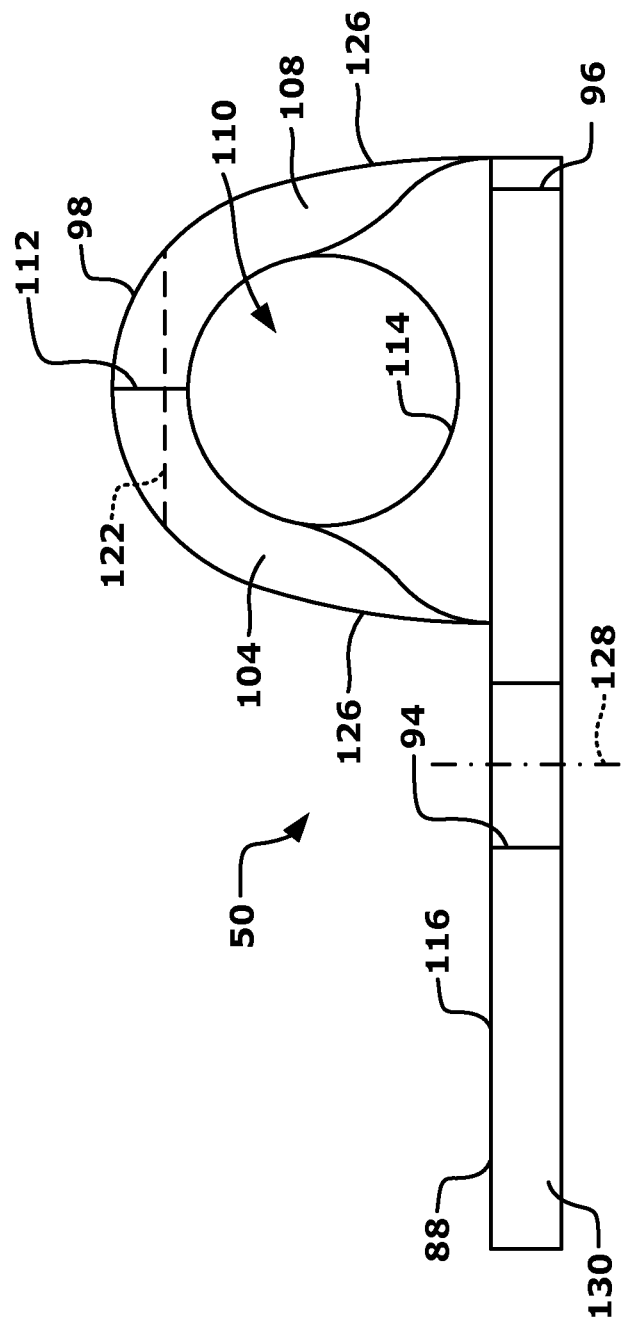
FIG. 9 is an end profile view of the one-piece support rod.

As shown in FIGS. 8a-9, each of the support rods 50 has a shaft portion 98 in addition to the support portion 88. The shaft portion 98 and the support portion 88 are unitarily formed. For example, the support rods 50 may be fabricated by cutting a single, unitary metal blank (not shown) having a consistent thickness throughout and then bending or folding a portion of the unitary metal blank to define the shaft portion 98 of the support rod 50, while the remainder of the unitary metal blank remains substantially planar in configuration and defines the support portion 88.

The shaft portion 98 of each of the head rest support rods 50 extends from a first end 102 to a second end 104. The first end 102 is a free end of the support rod 50 and is located opposite the support portion 88. The second end 104 of the shaft portion 98 is located at a neck portion 106 of the support rod 50, such that the support portion 88 is formed adjacent to the second end 104 of the shaft portion 98.

The neck portion 106 is interposed between the shaft portion 98 and the support portion 88. The geometry of the neck portion 106 is configured such that it transitions the support rod 50 from a tubular shape or surface that is defined by the shaft portion 98 to a planar shape or surface that is defined by the support portion 88.

The shaft portion 98 is defined primarily by an annular wall 108 that extends from the first end 102 of the shaft portion 98 to the second end 104 of the shaft portion 98. The annular wall 108 provides the tubular shape of the shaft portion 98 and thus defines a shaft cavity 110 that extends from the first end 102 of the shaft portion 98 to the second end 104 of the shaft portion 98.

The shaft portion 98 of each of the head rest support rods 50 includes a seam 112 that extends from the first end 102 of the shaft portion 98 to the second end 104 of the shaft portion 98. The seam 112 is formed as a result of the bending operation by which the annular wall 108 of the shaft portion 98 is formed from a flat metal blank. In particular, the seam 112 is formed when opposite edges of the flat metal blank are drawn together at a location that is circumferentially opposite from a base surface 114 that is defined within the shaft cavity 110 and which extends continuously between the interior of the shaft portion 98 and a first side 116 of the support portion 88.

The seam 112 extends in a longitudinal direction of the shaft portion 98. More particularly, the seam 112 extends parallel to a longitudinal axis 118 of the shaft portion 98, but is radially offset from the longitudinal axis 118 of the shaft portion 98. The seam 112 extends completely through the annular wall 108 of the shaft portion 98 from an outer surface 120 of the shaft portion 98 to the shaft cavity 110 of the shaft portion 98.

One or both of the head rest support rods 50 may include a locking notch 122 that is formed on the outer surface 120 of the shaft portion 98 and thus on the annular wall 108 of the shaft portion 98. The locking notch 122 of each of the support rods 50 is engageable with a respective one of the rod holders 70 in order to secure the support rods 50 of the head rest 32 with respect to the rear seat back 28 of the rear seat 14. Alternatively, one of the support rods 50 may include the locking notch 122 while the other of the support rods 50 does not include the locking notch 122, in the event that a single locking notch 122 is sufficient to secure a position of the head rest 32 relative to the rear seat back 28. The locking notch 122 extends substantially perpendicular to the longitudinal direction of the shaft portion 98. Furthermore, the locking notch 122 may extend only partially into the annular wall 108 of the shaft portion 98. In this manner, the locking notch 122 does not penetrate the shaft cavity 110 of the shaft portion 98.

The locking notch 122 is positioned near the second end 104 of the shaft portion 98. Thus, a distance between the locking notch 122 and the first end 102 of the shaft portion 98 is greater than a distance between the locking notch 122 and the second end 104 of the shaft portion 98. Also, the locking notch 122 can be formed on the outer surface 120 of the shaft portion 98 such that the locking notch 122 spans the seam 112 of the shaft portion 98.

The shaft portion 98 widens slightly at a jog 124 to define a flared portion 126 at the second end 104 of the shaft portion 98 that extends throughout the neck portion 106. Thus, the flared portion 126 defines an outer radius for at least part of the shaft portion 98 and the neck portion 106 that is greater than the nominal outer radius of the shaft portion 98.

The support portion 88 of each of the support rods 50 extends unitarily outward from the second end 104 of the shaft portion 98 by way of the neck portion 106 which provides a geometric transition between the tubular configuration of the shaft portion 98 and the substantially planar configuration of the support portion 88. As previously noted, the support portion 88 of each support rod 50 is connectable to the body portion 68 of the folding mechanism 64 to define a pivoting joint with respect thereto. Accordingly, the support portion 88 includes a circular rotation aperture 127 at which the support portion 88 is connected to the body portion 68 or a related part of the folding mechanism 64. The circular rotation aperture 127 extends along a center axis 128. The center axis 128 is perpendicular to the longitudinal direction of the shaft portion 98. More particularly, the center axis 128 is laterally offset from the longitudinal axis 118 of the shaft portion 98, such that the center axis 128 and the longitudinal axis 118 do not intersect one another. When assembled, the center axis 128 is coincident with the head rest axis 34. Outward from the circular rotation aperture 127, the support portion 100 has a substantially circular periphery 130.

At least part of the support portion 88 is a continuous extension of the annular wall 108 of the shaft portion 98. In particular, the first side 116 extends continuously and unitarily outward from the base surface 114 of the shaft portion 98. Thus, the first side 116 of the support portion 88 and the interior of the shaft cavity 110 of the shaft portion 98 all define a single continuous surface. Conversely, a second side 132 of the support portion 88 and the exterior of the annular wall 108 of the shaft portion 98 form a continuous surface.

The use cutout 94 and the folded cutout 96 are formed in the support portion 88 of each support rod 50 along the substantially circular periphery 130. The use cutout 94 is substantially U-shaped in a plane that is parallel to the longitudinal direction of the shaft portion. Furthermore, the use cutout 94 may be positioned on the support portion 88 substantially opposite the shaft portion 98. The folded cutout 96 is formed on the support portion 88 adjacent to the second end 104 of the shaft portion 98.

From the foregoing, it will be appreciated that the shaft portion 98 and the support portion 88 are unitarily formed. More particularly, the shaft portion 98 and the support portion 88 are formed from a single piece of material, the substantially planar metal blank discussed previously, which may have a consistent thickness throughout. Because the shaft portion 98 and the support portion 88 are unitarily formed, the head rest support rods 50 may each be produced from a single piece of material, without the need for welding or other types of connections.

In use, the head rest support rods 50 are utilized to connect the head rest 32 to the rear seat back 28 of the rear seat 14. In the course of moving the rear seat 14 from the passenger carrying configuration to the cargo carrying configuration, the head rest support rods 50, in combination with the remainder of the folding mechanism 64, allow pivotal movement of the head rest 32 with respect to the seat back 28 of the rear seat 14 from an upright use position to a folded position. In this manner, the required size of the head rest clearance area 46 is reduced, thereby maximizing cargo space.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A headrest support rod, comprising:
   a shaft portion having a first end, a second end, and an annular wall, wherein the annular wall defines a tubular shape having a cavity that extends from the first end to the second end, wherein the shaft portion includes a seam that extends from the first end of the shaft portion to the second end of the shaft portion;
   a notch that is formed on an outer surface of the shaft portion, wherein the notch spans the seam of the shaft portion; and
   a support portion that is formed adjacent to the second end of the shaft portion, the support portion having an outer periphery and a planar wall defined within the outer periphery, wherein the tubular shape defined by the annular wall of the shaft portion transitions to the planar wall, such that at least part of the support portion is a continuous extension of the annular wall of the shaft portion, wherein the shaft portion and the support portion are unitarily formed.

2. The headrest support rod of claim 1, wherein the outer periphery of the support portion defines a substantially circular arc in a plane that is parallel to a longitudinal direction of the shaft portion.

3. The headrest support rod of claim 2, wherein a cutout is formed along the substantially circular arc defined by the outer periphery of the support portion.

4. The headrest support of claim 3, wherein the cutout is substantially U-shaped in a plane that is parallel to a longitudinal direction of the shaft portion.

5. The headrest support rod of claim 3, wherein the cutout is formed adjacent to the second end of the shaft portion.

6. A headrest support rod, comprising:
   a shaft portion having a first end, a second end, and an annular wall, wherein the annular wall defines a cavity that extends from the first end to the second end, wherein the shaft portion includes a seam that extends from the first end of the shaft portion to the second end of the shaft portion;
   a notch that is formed on an outer surface of the shaft portion, wherein the notch spans the seam of the shaft portion; and
   a support portion that is formed adjacent to the second end of the shaft portion, at least part of the support portion being a continuous extension of the annular wall of the shaft portion, wherein the shaft portion and the support portion are unitarily formed, wherein the support portion defines a circular rotation aperture that extends along a center axis that is perpendicular to a longitudinal direction of the shaft portion.

7. The headrest support rod of claim 6, wherein the center axis of the rotation aperture is laterally offset from a longitudinal axis of the shaft portion such that the center axis and the longitudinal axis do not intersect one another, and further wherein the longitudinal axis of the shaft portion is parallel to a longitudinal direction of the shaft portion.

8. The headrest support rod of claim 1, wherein the notch extends in a direction that is perpendicular to a longitudinal direction of a shaft portion.

9. The headrest support rod of claim 1, wherein the notch extends only partially into the annular wall of the shaft portion such that the notch does not penetrate the cavity of the shaft portion.

10. The headrest support rod of claim 1, wherein a distance between the notch and the first end of the shaft portion is greater than a distance between the notch and the second end of the shaft portion.

11. A headrest support rod, comprising:
   a shaft portion having a first end, a second end, and an annular wall, wherein the annular wall defines a cavity that extends from the first end to the second end, wherein the shaft portion includes a seam that extends from the first end of the shaft portion to the second end of the shaft portion;

a notch that is formed on an outer surface of the shaft portion, wherein the notch spans the seam of the shaft portion; and a support portion that is formed adjacent to the second end of the shaft portion, at least part of the support portion being a continuous extension of the annular wall of the shaft portion, wherein the shaft portion and the support portion are unitarily formed.

12. The headrest support rod of claim 1, wherein the seam is located circumferentially opposite from a section of the annular wall from which the support portion continuously extends.

13. The headrest support rod of claim 1, wherein the shaft portion and the support portion are formed from a single piece of material having a consistent thickness throughout.

14. The headrest support rod of claim 3, wherein the cutout is formed along a portion of the outer periphery that is distal relative to the shaft portion.

* * * * *